United States Patent [19]

Fukumori et al.

[11] 3,948,570
[45] Apr. 6, 1976

[54] METHOD AND SYSTEM FOR CONTROLLING THE BRAKING PRESSURE IN RESPONSE TO THE RATE OF VARIATION IN WHEEL SPEED

[75] Inventors: Yukitsugu Fukumori; Masaaki Katsumata, both of Yokohama, Japan

[73] Assignee: Nissan Motor Co., Ltd., Yokohama, Japan

[22] Filed: Feb. 3, 1975

[21] Appl. No.: 546,774

[30] Foreign Application Priority Data

Feb. 8, 1974 Japan.............................. 49-15520
Apr. 3, 1974 Japan.............................. 49-37681

[52] U.S. Cl. ................................ 303/21 P; 303/20
[51] Int. Cl.² ............................................ B60T 8/02
[58] Field of Search. 188/181 C; 235/150.2, 92 CA, 235/92 CT, 92 EV, 92 CC; 303/20, 21 AU; 307/233 B; 317/5; 318/601; 324/161; 328/133, 140; 340/53, 62, 263

[56] References Cited
UNITED STATES PATENTS

| | | | |
|---|---|---|---|
| 3,608,978 | 9/1971 | Neisch............................ | 303/21 EB |
| 3,620,577 | 11/1971 | Neisch et al..................... | 303/21 EB |
| 3,735,200 | 5/1973 | Kritz................................ | 317/5 |
| 3,769,595 | 10/1973 | Ooya et al...................... | 307/233 B X |
| 3,840,277 | 10/1974 | Bouthors........................ | 303/21 P |

Primary Examiner—Trygve M. Blix
Assistant Examiner—Stephen G. Kunin

[57] ABSTRACT

Trains of electrical pulses are produced at variable rates proportional to the vehicle and wheel speeds respectively and fed into a first and a second pulse counter, each producing its output upon counting of a predetermined number which is determined such that an optimum slip rate occurs when the outputs of these counters are produced at the same time. The output of these counters are utilized to operate and release an actuator which controls the flow of hydraulic pressure applied upon depression of a brake pedal to the wheels of a vehicle.

7 Claims, 5 Drawing Figures

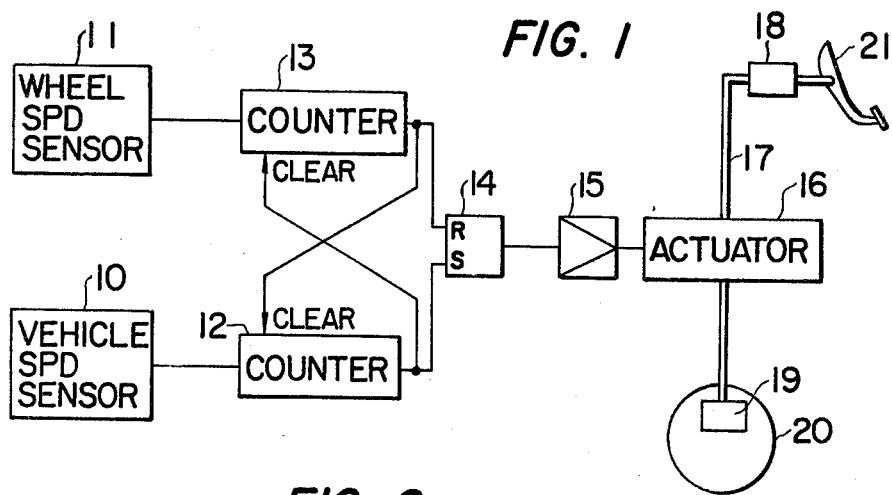

METHOD AND SYSTEM FOR CONTROLLING THE BRAKING PRESSURE IN RESPONSE TO THE RATE OF VARIATION IN WHEEL SPEED

The present invention relates generally to a brake control system for automotive vehicles, and more particularly to an improved brake control system which controls the application of brake to allow the actual slip rate of the wheel to approach the optimum value of slip rate.

The sudden application of a substantial amount of brake force would tend to cause a slip to occur between the contacting surfaces of the vehicle wheels and the roadway. Preventive measures have been made to overcome such hazard by unlocking the braked wheels until the slip diminishes to a value within a safety range. It is known that the slip rate, which is defined by the ratio of the vehicle speed to the difference between the vehicle speed and the circumferential speed of the wheel (wheel speed), has an optimum value which is usually in the range between 10 to 20%. If the unlocking of the brake should cause the wheel to increase its circumferential speed to a value approaching the vehicle speed, it is desirable to decrease the wheel speed by reapplying the brake such that the actual slip rate becomes substantially equal to an optimum value.

Therefore, an object of the invention is to provide an improved brake control system which controls the application of braking pressure to the wheels to permit the actual slip rate to approach the optimum value when manual braking effort is being applied in an attempt to decelerate the vehicle.

Another object of the invention is to provide an improved brake control system which takes advantage of the economy of an analogue circuit for detection of rate of change in wheel speed and a digital circuit of a high precision type to obtain actual slip rate.

Briefly, in accordance with the present invention, the speed of a vehicle is detected by a speed sensor such as a conventional doppler radar and represented by the number of electrical pulses. The circumferential speed of a wheel of the vehicle is also detected and represented in similar form. Signals from these sensors are applied to respective counters which deliver an output when a predetermined number is counted. Each of the predetermined numbers of these counters are so selected that an optimum slip rate occurs when these counters produce their respective output at the same time. Therefore, upon application of braking pressure to the wheels, the occurrence of an output from either one of the counters indicates whether the actual slip rate is greater or smaller than the optimum slip rate. If the actual slip rate is greater than the optimum value, that is, the wheel is decelerated to a value greater than the optimum value of deceleration, the hydraulic brake pressure is interrupted to unlock the brake, and if the actual slip rate is smaller than the optimum value, that is, the wheel is accelerated by the unlocking of the brake to a value greater than the optimum value of acceleration, the brake will be locked again. These processes will be repeated by the alternate occurrence of pulses from the vehicle and wheel speed sensors until the optimum slip rate is obtained.

In accordance with another aspect of the invention, there is provided an analogue circuit which comprises a frequency-to-voltage converter connected to the wheel speed sensor to produce a voltage signal having an amplitude proportional to the repetition frequency of the input signal. The voltage signal is differentiated by a conventional differentiator circuit so that the differentiated signal represents the rate of change in wheel speed, the polarity of the signal representing the direction of the speed change, that is, acceleration or deceleration. Two comparators are provided one producing an output except when the rate of speed change is greater than a predetermined value of acceleration and the other producing an output except when that rate is greater than a predetermined value of deceleration. When the rate of change in wheel speed is within the range between the predetermined values of acceleration and deceleration, there is simultaneous occurrence of outputs from these comparators, and both of the pulse counters are enabled to perform counting of the input pulses. If one of the comparators ceases producing its output, the associated counter is disabled while allowing the other counter to receive input pulses, and upon counting of the predetermined number, the brake is controlled in accordance with the signal from that counter. Since the detection of rate of speed change is carried out by analogue circuit, the need of the use of a costly digital circuit is advantageously avoided while the determination of actual slip rate which requires precision is performed by digital counters.

The invention will be described in more detail in the following description with reference to the accompanying drawings, in which:

FIG 1 is a schematic circuit diagram of a first preferred embodiment of the invention;

FIG 2 is a schematic circuit diagram of a second preferred embodiment of the invention;

FIG. 3 is a schematic circuit diagram of a modified form of the second embodiment; and FIG. 5 4a–4b are graphs showing input-output characteristics of comparators employed in the embodiments of FIGS. 2 and 3.

Figure 4A:
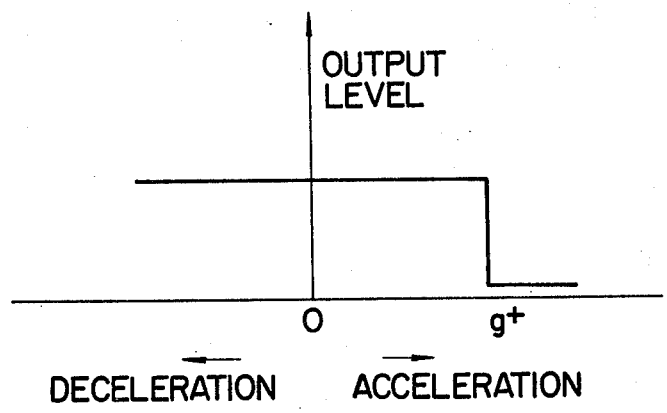

Referring now to the drawings, particularly to FIG 1, a brake control system embodying the present invention is shown and comprises a vehicle speed sensor 10 such as a conventional doppler radar which determines the relative motion of the vehicle to ground by measuring the shift in frequency of an echo and converts the frequency shift into a train of pulses such that the pulses occur at a varible rate proportional to the vehicle speed and a wheel speed sensor 11 which determines the circumferential speed of a wheel of the vehicle by measuring the rotation of the drive axle and converts the speed of ratation into a train of pulses such that the pulses occur at a variable rate proportional to the circumferential speed of the wheel. If there is no slip between the contacting surfaces of the wheel and the roadway, the two speeds are substantially equal and the vehicle speed sensors 10 and the wheel speed sensor 11 produces pulses at the same rate of ocurrence. A M-bit counter 12 is connected to the vehicle speed sensor 10 to count the number or frequency of the input pulses and produces an output when M bits of pulses have been counted. An N-bit counter 13 is connected to the wheel speed sensor 11 to count the number of input pulses to produce an output when N bits have been counted. As illustrated in FIG. 1, the output circuits of these counters are connected such that the contents of each counter are cleared by the output of the other and further connected to a flip-flp 14 such that the M-bit counter 12 sets the flip-flop while the N-bit counter 13 resets it.

Assuming that the frequency of the pulses derived from the vehicle speed sensor 10 be $f_1$ (Hz), the vehicle speed, $v_1$ (m/sec) and $k_1$, a constant $$f_1 = k \cdot v_1 \qquad (1)$$

The distance ($d_1$) which the vehicle travels while the M-bit counter 12 counts M bits of imput pulses is given by $$d_1 = M \cdot v_1 / f_1 = M/k_1 \qquad (2)$$

Likewise, the frequency ($f_2$) of pulses derived from the wheel speed sensor 11 is related to the circumferential speed ($v_2$) of the wheel and given as follows:

$$f_2 = k_2 \cdot v_2 \qquad (3)$$

where $k_2$ is a constant. Assuming that the rate of slip(s) between the contacting surfaces of the wheel and the roadway be $(v_1 - v_2)v_1$, the distance ($d_2$) travelled by the vehicle during the count of N by the N-bit counter 12 is given by $$d_2 = N \cdot v_1 / f_2 = (N \cdot v_2 / f_2)(v_1 / v_2) = (N/k_2)(1/1-s) \qquad (4)$$

Therefore, the ratio M/N is given by $$M/N = (k_1/k_2)(1/1-s_o) \qquad (5)$$

where $s_o$ is an optimum slip rate when $d_1$ and $d_2$ are substantially equal to each other.

Since the pulses derived from the vehicle speed sensor 10 and the wheel speed sensor 11 occur at a rate of M bits and N bits per second, respectively, when the distances $d_1$ and $d_2$ are substantially equaL to each other and during which the optimum slip rate exists, the occurrence of a signal at the output of the counters 12 and 13 indicates that the slip rate is greater or smaller than the slip rate $s_o$. For example, if a signal is generated at the M-bit counter 12 preceding to the occurrence of a signal at the output of the N-bit counter 13, the slip rate is greater than the optimum slip rate and distance $d_1$ is smaller than $d_2$.

Upon the occurrence of a signal from the M-bit counter 12, the flip-flop 14 is set and a high level signal appears at its Q output, which is amplified by an amplifier 15 and applied to an actuator 16 which controls the passage 17 of a braking hydraulic pressure supplied from a conventional master cylinder 18 to a slave cylinder 19 of a brake 20 when the brake pedal 21 is being depressed. Consequently, the actuator 16 is activated to block the passage 17 to unlock the brake 20 with the resultant decrease in slip rate. The unlocking condition continues until the slip rate approaches the optimum slip rate.

On the other hand, if the slip rate is smaller than the optimum slip rate, a signal will be produced from the N-bit counter 13 which resets the flip-flop 14 and the actuator 16 deenergized to reapply the pressure to the brake 20.

It is seen that by detection of the difference between the vehicle and wheel speeds and consequently the difference between the actual and optimum slip rates, the hydraulic brake pressure is controllably applied to the brake shoe such that it is operated to lock and unlock the wheel while the brake pedal is being depressed in order to permit the actual slip rate to approach the optimum value.

It was shown experimentally that the optimum slip rate is from 10 to 20% depending upon the type of tires used and the surface of roadway, the number of bits to be counted by the counters 12 and 13 may be readily determined.

A refined form of the present invention is shown in FIG 2 in which like numerals indicate like parts. The brake control system further comprises a frequency-to-voltage converter 30 connected to the wheel speed sensor 11, a differentiator circuit 31, a first comparator 32 and a second comparator 33 connected in parallel therewith to the differentiator 31, all of which constitute an analogue circuit which functions to detect whether the rate of change in the wheel speed is within a predetermined range.

The frequency-to-voltage converter 30 may be a frequency discriminator, for example, such as used in frequency-modulated receivers and automatic frequency control circuits, which delivers an output whose magnitude is proportional to the deviations of a signal from a predetermined frequency value. The output from the converter 30 thus varies in amplitude in proportion to the repetition frequency of the pulses derived from the wheel speed sensor 11 and is differentiated by the differentiator circuit 31. As is well known in the art, the differentiator output is proportional to the rate of change in amplitude of an applied signal, the amplitude of the differentiator output indicates the rate of change in the wheel speed and its polarity indicates the direction of the change, or acceleration and deceleration of rotation of the wheel.

The first comparator 32 is designed to compare the input signal level with a predetermined potential level to deliver an output except when the input signal level is greater than that predetermined level so that the output is present while the rate of change in the wheel speed is below a predetermined value of acceleration and while the wheel is decelerated as indicated in FIG 4a. On the other hand, the second comparator 33 delivers an output except when the input signal level is greater than a predetermined value so that output is present while the rate of change in the wheel speed is below a predetermined value of deceleration and while the wheel is accelerated as indicated in FIG 4b.

The output signals from the comparators 32 and 33 are applied to the M-bit and N-bit counters 12 and 13 respectively by way of And gates 34 and 35 respectively. The signals from the vehicle speed sensor 10 and the wheel speed sensor 11 are applied through the And gates 34 and 35 to the counters 12 and 13 respectively. Therefore, these counters are enabled by the signals from the comparators 32 and 33 to receive the pulses derived from the respective speed sensors while the rate of change in wheel speed is within a limited range of acceleration and deceleration to permit control of the actuator 16 as previously described.

Figure 4B:
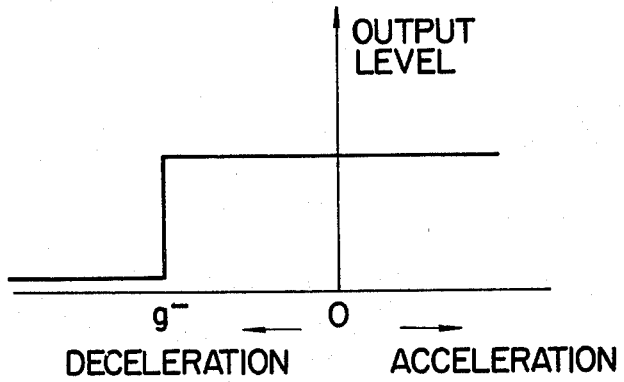

If the wheel is decelerated to a value greater than the predetermined value of deceleraton ($g^-$) as indicated in FIG. 4b by application of brake, the second comparator 33 produces no output to thereby disable the counter 13. This allows the counter 12 to receive input pulses and upon the occurrence of the Mth bit, the counter 12 produces an output which sets the flip-flop 14, thereby causing the actuator 16 to be activated to unlock the brake 20. In like manner, the comparator 32 will produce no output when the wheel is accelerated to a value greater than the predetermined value of acceleration ($g^+$) as indicated in FIG. 4a upon release of the brake pedal 21 and the counter 13 is allowed to receive input pulses derived from the wheel speed sensor 11 and produces an output upon the occurrence of the Nth bit pulse which resets flip-flop 14 to thereby cause the actuator 16 to be restored to lock the brake 20.

Therefore, it will be seen that when the rate of change in wheel speed is outside of the predetermined range, either one of the counters 12 and 13 will be enabled depending upon the direction of the rate of the speed change, that is, acceleration or deceleration, and the actuator 16 will be operated accordingly to permit the speed change rate to approach to a value within the predetermined range which is defined by the values $g^+$ and $g^-$. When the speed change rate comes to within the predetermined range, the actuator 16 will be intermittently operated to permit the actual slip rate to approach the optimum value of slip rate.

An alternative arrangement is shown in FIG 3 which is similar to the embodiment shown in FIG 2 except that And gates 34 and 35 are removed and Nand gates 40 and 41 are provided having their one input terminal connected to the comparators 32 and 33 respectively. Nand gate 40 has its other input terminal connected to the output circuit of flip-flop 14 and Nand gate 41 has its other input terminal connected to the Nand gate 40. The pulses derived from the vehicle and wheel speed sensors 10 and 11 are directly applied to the counters 12 and 13, respectively.

When the comparators 32 and 33 produce their outputs, Nand gate 40 will produce a "0" or "1" signal depending upon the ocurrence of "1" or "0" signal at the output of flip-flop 14. Since a "1" signal is applied to one input terminal of the Nand gate 41, the signal level at the output of Nand gate 41 is determined by the signal level or presence of "1" or "0" signal at the output of flip-flop 14. Therefore, the actuator 16 will be operated intermittently in accordance with the occurrence of signal from the counters 12 and 13. On the other hand, if counter 32 places a "1" signal and counter 33 places "0" signal, Nand gate 41 will apply a "1" output through amplifier 15 to the actuator 16 unlock the brake 20, no matter what condition may exist at the output of Nand gate 40, while if counters 32 and 33 place "0" and "1" signals on their outputs respectively, Nand gate 41 will produce a "1" signal since Nand gate 40 will place "1" no matter what condition may exist at the output of flip-flop 14 so that the actuator 16 will be deactivated to unlock the brake 20.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method of controlling a brake of an automotive vehicle having a plurality of wheels a manual brake apply means for applying a braking pressure to said wheels, means disposed in a conduit for said pressure for controlling the application of said pressure to said wheel, comprising the steps of:
    a. sensing the speed of said vehicle and producing a first signal having a frequency proportional to said speed; b. sensing the circumferential speed of said wheel and producing a second signal having a frequency proportional to said circumferential speed;
    c. counting the frequency of said first signal for producing a disabling signal when a first predetermined number is counted and applying the same to said control means to cause the same to interrupt the passage of said braking pressure;
    d. counting the frequency of said second signal for producing an enabling signal when a second predetermined number is counted and applying the same to said control means to cause the same to provide conduit for said pressure to thereby apply a braking pressure to said wheel; and
    e. enabling both of the steps of (c) and (d) when the rate of change in said circumferential speed of the wheel is within a preselected range and enabling one of the said steps (c) and (d) when said rate is outside of said preselected range.

2. The method as claimed in claim 1, wherein said step (e) comprises the step of:
    f. sensing the rate of change in said circumferential speed of the wheel;
    g. comparing the speed change rate with a preselected value to produce a third signal except when said rate is greater than a preselected value of acceleration;
    h. comparing the speed change rate with a preselected value to produce a fourth signal except when said rate is greater than a preselected value of deceleration; and
    i. enabling the steps of (c) and (d) by said third and fourth signals respectively.

3. A brake control system for an automotive vehicle having a plurality of wheels and manual brake apply means for applying a braking pressure to said wheels, comprising, a vehicle speed detector for sensing the speed of said vehicle and producing a first signal having a frequency proportional to the vehicle speed, a wheel speed detector for sensing the circumferential speed of said wheels and producing a signal having a frequency proportional to the circumferential speed of the wheel, a first counter for counting the frequency of said first signal to produce an output when a first predetermined number is counted and a second counter for counting the frequency of said second signal to produce an output when a second predetermined number is counted, said first counter being arranged to clear said second counter and said second counter being arranged to clear said first counter, and means disposed in the passage of said brake pressure to control the application of said pressure to said wheels in response to said first and second signals such that said braking pressure is applied upon the occurrence of said second signal and interrupted upon the occurrence of said first signal.

4. A brake control system as claimed in claim 3, wherein said first and second predetermined numbers are selected such that the ratio of said first to second predetermined numbers is related to an optimum value of slip rate determined by the ratio of said vehicle speed to the difference between said vehicle speed and said circumferential speed of the wheel, whereby the rate of slip of said vehicle approaches said optimum slip rate when said manual brake means is being actuated.

5. A brake control system as claimed in claim 3, further comprising means for enabling both of said first and second counters when the rate of change in said circumferential speed of the wheel is within a preselected range and for enabling one of said counters when said rate of change in said speed is outside of said preselected range.

6. A brake control system as claimed in claim 3, further comprising speed change sensing means connected to said wheel speed detector for sensing the rate of change in speed to produce a third signal representative of the acceleration and deceleration of said vehicle, a first comparator connected to said speed change sensing means for comparing said third signal with a first predetermined value to produce a first output except when the rate of change in said circumferential speed of said wheel is greater than a predetermined value of acceleration and a second comparator connected to said speed change sensing means for comparing said third signal with a second predetermined value to produce a second output except when the rate of change in said circumferential speed of said wheel is greater than a predetermined value of deceleration, said first and second counters being enabled by the occurrence of said first and second outputs respectively.

7. A brake control system as claimed in claim 3, wherein said speed change sensing means comprises means for converting the frequency of said second signal into a signal having an amplitude proportional to said frequency and means for differentiating said frequency proportional amplitude signal whereby the magnitude of the differentiated signal is representative of acceleration and deceleration of said vehicle.

* * * * *